United States Patent [19]

Limbacher

[11] 4,431,101

[45] Feb. 14, 1984

[54] CLUTCH ACTUATING CONTROL MECHANISM

[75] Inventor: Bernhard Limbacher, Niederwerrn, Fed. Rep. of Germany

[73] Assignee: Fichtel & Sachs AG, Schweinfurt, Fed. Rep. of Germany

[21] Appl. No.: 249,472

[22] Filed: Mar. 31, 1981

[30] Foreign Application Priority Data

Apr. 5, 1980 [DE] Fed. Rep. of Germany ....... 3013436

[51] Int. Cl.³ ............................................ F16D 13/75
[52] U.S. Cl. .................................. 192/111 A; 74/512; 188/196 BA
[58] Field of Search ................... 188/196 A, 196 AB; 192/111 A, 111 R, 111 B; 74/512, 501.5 R

[56] References Cited

U.S. PATENT DOCUMENTS

| | | | |
|---|---|---|---|
| 3,621,959 | 11/1971 | Gale et al. | 192/111 A |
| 4,227,603 | 10/1980 | Fasano | 74/512 |
| 4,260,049 | 4/1981 | Fasano | 192/111 A |
| 4,385,681 | 5/1983 | Conrad et al. | 192/111 A |

FOREIGN PATENT DOCUMENTS

| | | | |
|---|---|---|---|
| 2906957 | 8/1979 | Fed. Rep. of Germany | 192/111 A |
| 5431143 | 6/1977 | Japan | 74/501.5 R |
| 1411467 | 10/1975 | United Kingdom . | |
| 2022210 | 12/1979 | United Kingdom . | |

Primary Examiner—Leslie A. Braun
Assistant Examiner—Anthony W. Raskob, Jr.
Attorney, Agent, or Firm—Toren, McGeady and Stanger

[57] ABSTRACT

An operating mechanism particularly for the clutch of a motor vehicle operating to automatically change the normal actuating position of the clutch conditional upon wear includes a first lever member and a second lever member with a ratchet mechanism operatively interposed therebetween. The pawl of the ratchet mechanism is urged in a direction disengaged from the ratchet wheel of the ratchet mechanism by a control member when a boundary position of wear is reached thereby to minimize play in the clutch.

8 Claims, 3 Drawing Figures

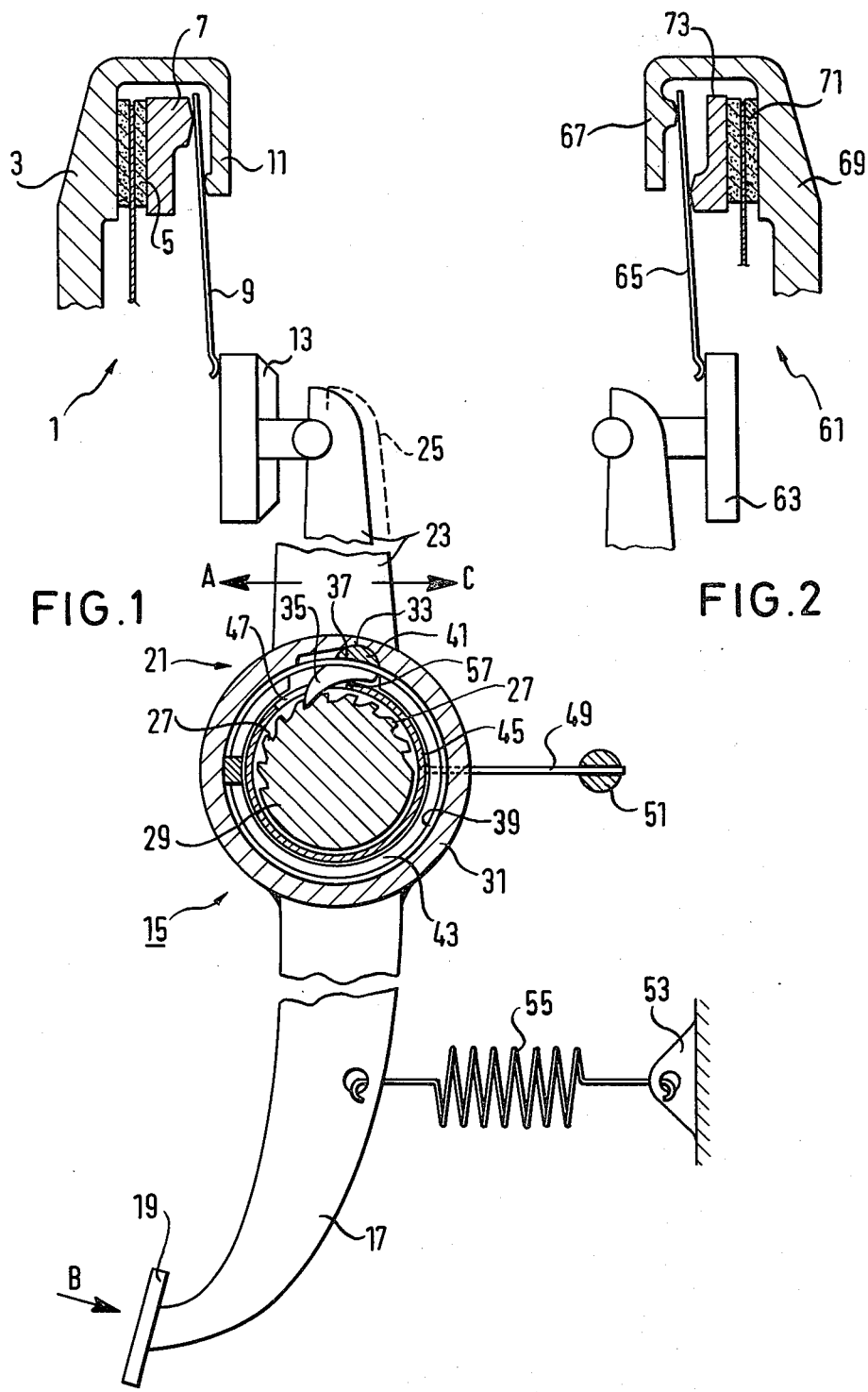

CLUTCH ACTUATING CONTROL MECHANISM

The present invention relates generally to an operating mechanism for a device such as the clutch of a motor vehicle and, more particularly, to an arrangement whereby automatic readjustment of the actuating mechanism of such a device may occur to change its normal actuating position conditional upon wear.

Devices of the type to which the present invention relates usually comprise a first lever member supported to be pivotable about a rotational axis and adapted to be driven for actuation of the device by rotation thereof in a predetermined direction. A second lever member supported to be pivotable about the same rotational axis is coupled with the device to be actuated. A locking pawl mechanism or ratchet means operates to rotate the second lever member in the predetermined rotational direction of the first lever member and the ratchet means includes a circular ratchet wheel mounted upon one of the lever members concentrically with the rotational axis and at least one pawl pivotally supported on the other lever member.

An arrangement of this type is known from German Offenlegungsschrift No. 29 06 957. In this arrangement, automatic readjustment of the normal position of a clutch cable of a motor vehicle friction clutch occurs when the normal position changes during wear of the clutch lining. The pawl of the ratchet mechanism is not continuously in engagement with the teeth of the ratchet wheel, but it is coupled with the clutch cable and it is swiveled by this cable during release of the clutch into the ratchet teeth. Consequently, until the pawl engages, a path of free movement must be overcome which is undesirable in itself because this path of free movement must be taken into consideration in selecting the dimensions of the lever transmissions of the actuating mechanism. The path of free movement reduces the power transmission that can be accomplished between the clutch pedal and the release elements of the clutch.

Accordingly, it is the task of the present invention to provide a structurally simple arrangement for automatic readjustment of the actuating mechanism of a device such as a clutch which changes its normal actuating position conditional upon wear and which does not introduce any no-load play into the actuating mechanism. The arrangement should especially be suitable for automatic readjustment of the actuating mechanism of a motor vehicle friction clutch.

SUMMARY OF THE INVENTION

The present invention is directed toward a device of the type described wherein the pawl is elastically held in the normal actuating position in engagement with the teeth of the ratchet wheel and wherein on the side of the pawl facing against the predetermined rotational direction, or on a part firmly connected with the pawl, a control element, attached to the device, projects into the path of movement of the pawl or the part connected with the pawl in such a way that it swivels the pawl out of the ratchet wheel teeth in a boundary position of wear of the normal actuating position.

The ratchet mechanism is consequently continuously engaged and the actuating mechanism, for example, the clutch cable or the like, need not overcome a path of free movement before the actuating forces begin to act upon the device to be actuated.

In a preferred structurally simplified embodiment of the invention, the pawl is provided at a first lever member and the ratchet wheel is connected with a second lever member. In such an embodiment, the control element between the swivel axis and the engagement edge of the pawl may act directly on the pawl thereby facilitating construction and support of the pawl. Since the pawl is again released from the control element during the readjustment process, there is ensured that the ratchet mechanism is stepped up by only a single ratchet tooth.

The control element is advantageously constructed as a cylindrical sleeve which is provided with an opening for passage of the pawl therethrough and which is arranged between the swivel axis of the pawl and the ratchet wheel coaxially with respect to a common rotational axis of the lever members in such a way that the opening rim of the pawl, directed in the predetermined rotational direction, is pressed out of the ratchet teeth. An advantage of this structure is that a relatively compact construction may be provided which is not susceptible to breakdown. A strong and nevertheless structurally simple support of the pawl is accomplished by supporting the pawl in a recess of a cylindrical wall of the lever member coaxial with the common rotational axis of the lever members wherein the part of the pawl projecting beyond the recess is provided with a slot extending perpendicularly to the rotational axis of the lever members. The bottom of the slot extends in the circumferential direction of the cylinder wall when the pawl is in the engaged position. Additionally, a spring ring resting elastically at the cylinder wall extends through the slot. This spring ring not only produces an initial stress which holds the pawl in engagement with the ratchet wheel, but it also attaches the pawl in the recess. The cylinder wall may relate to the outer shell of a cylinder as well as also to the inner shell of a hollow cylinder.

In a further important embodiment of the invention, the first lever member is prestressed by means of the spring in the predetermined direction of rotation against the second lever member. Such a spring not only compensates the no-load play resulting from manufacturing tolerances, but also provides for automatic readjustment of the ratchet mechanism when a boundary position of wear is reached without actuation of the actuating mechanism. The spring may act between the two lever members. However, if the actuating mechanism of a motor vehicle friction clutch which is releasable by means of a clutch pedal is to be readjusted by means of this arrangement, then the spring will preferably act between the clutch pedal and a support attached to the vehicle. It is advantageous if one of the two lever members undertakes the function of the lever for the actuating mechanism which is present in any case. For example, the first lever member may be constructed as the clutch pedal of the vehicle or the second lever member may form the release fork of the motor vehicle friction clutch.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is a schematic view partially in section showing a motor vehicle friction clutch in the released position with the corresponding automatic readjusting actuating mechanism of the invention;

FIG. 2 is a schematic view partially in section of a motor vehicle friction clutch which may be used with the actuating mechanism shown in FIG. 1 and which is operated by a pulling action.

DETAILED DESCRIPTION OF THE PREFERRED EMBODIMENTS

Figure 3:
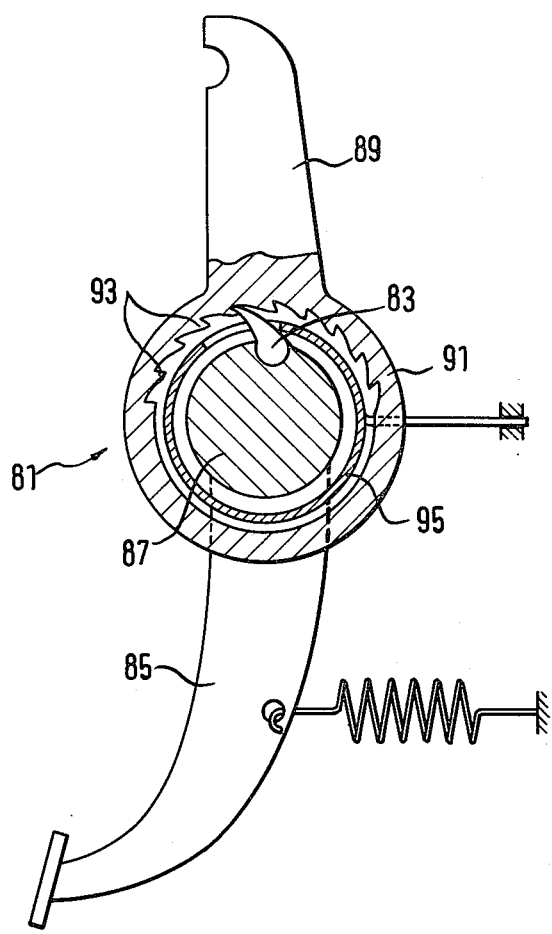
FIG. 3 is a schematic sectional view of another embodiment of the automatic readjusting mechanism of the invention.

Referring now particularly to FIG. 1, a clutch assembly arranged in accordance with the present invention is shown which includes a conventional motor vehicle friction clutch 1 having a flywheel 3, a clutch disc 5 carrying a friction lining, a pressure plate 7, and a diaphragm spring 9. The diaphragm spring 9 rests, along an outer range thereof, against the pressure plate 7 and the spring 9 is supported along a center range thereof on its side facing away from the pressure plate 7 at a peripheral flange 11 of the flywheel 3.

A release element 13 acts at the inner range or edge of the diaphragm spring 9 to tilt the diaphragm spring 9 about its support circumference at the flange 11 upon movement of the element 13 in the direction of the arrow A whereupon the clutch disc 5 is released from clamping engagement between the flywheel 3 and the pressure plate 7. Thus, the clutch 1 which is usually engaged is thereby disengaged.

The release element 13 is released by means of a clutch mechanism, generally identified with reference numeral 15. The clutch mechanism comprises a clutch pedal 17 having a footplate 19 upon which the driver of the motor vehicle may apply a force for release of the clutch by movement of the pedal 17 in the direction B. Movement of the clutch pedal 17 is transferred by means of a locking pawl mechanism or ratchet means 21 to a release fork 23 which acts upon the release element 13. Movement of the clutch pedal 17 in the direction of the arrow B effects movement of the release fork 23 in the direction of the arrow A and consequently produces disengagement of the clutch 1.

In FIG. 1, the clutch pedal 17 and the release fork 23 are shown connected to one structural unit. By showing the clutch pedal 17 and the release fork 23 partially in section, it will more clearly be shown that between the locking pawl 21 and the clutch pedal 17 or the release fork 23 additional force transmission mechanisms, for example, clutch cables or rod linkages or the like, may be connected such that only one of these structural parts is connected with the ratchet mechanism to form a structural unit.

The ratchet mechanism 21 automatically compensates for deviations of the actuating mechanism 15 from its originally set normal actuating position. For example, FIG. 1 shows the original normal actuating position, i.e., the rest position when the clutch pedal 17 is released. The normal actuating position changes as a result of wear of the friction lining of the clutch disc 5 or the like, wherein the normal position of the elements of the actuating mechanism 15 also changes. The release fork 23 shifts during increasing wear in the direction of the arrow C opposite its release direction A into a normal position 25 which differs from the original normal actuating position. The clutch pedal 17, however, also changes its normal position together with the release fork 23.

The ratchet mechanism 21 automatically compensates for changes conditional upon wear of the normal actuating position of the clutch pedal 17. The ratchet mechanism 21 comprises a shaft 29 which is rotatably supported on the vehicle and which is provided on its outer circumference at least partially with ratchet teeth 27 as well as a sleeve 31 which is also rotatably supported at the vehicle. The release fork 23, or a radially projecting lever coupled with the release fork 23, is connected nonrotatably with the shaft or ratchet wheel 29. The sleeve 31 carries the radially projecting clutch pedal 17 or a lever connected with the clutch pedal by means of a rod linkage or the like. A pawl 35 engages in the ratchet teeth 27 and is located pivotally in a half-cyclindrical recess 33 at the inner shell of the sleeve 31. The pivot axis of the pawl 35 extends parallel to the pivot axis of the shaft or ratchet wheel 29 or to the pivot axis of the coaxial hollow cylindrical sleeve 31. The pawl 35 has a slot in a plane extending perpendicularly to the pivot axis and the bottom 37 of the slot aligns approximately with the inner shell of the sleeve 31. Extending through the slot is a spring ring 39 which presses a half-cylindrical foot 41 of the pawl 35 into the recess 33 and holds it there. The slot bottom 37 of the pawl 35 is arranged in such a way that the pawl is in continuous engagement with the ratchet teeth 27. However, the pawl 35 may be elastically deflected against the action of the spring ring 39 which holds the pawl 35 in this position. The spring ring 39 also sits in a circumferential groove 43 which axially guides the ring and consequently the pawl 35.

A control sleeve 45 is coaxially arranged between the sleeve 31 and the shaft 29. The control sleeve 45 has an opening for passage therethrough of the pawl 35 as well as a projection 49 which is brought out of the sleeve 31. The projection 49 and consequently the control sleeve 45 are nonrotatively held in a bearing 51 attached to the vehicle. The bearing 51 may be adjustable in its angular position with respect to the pivot axis of the ratchet mechanism 21.

The pawl 35 engages in the teeth 27 of the ratchet wheel in such a way that, during rotation of the sleeve 31 in the direction of the arrow B, the release fork 23 is moved in the direction of the arrow A, that is, in the release direction. A spring 55 clamped between the clutch pedal 17 and a support 53 attached to the vehicle prestresses the pawl 35 in the rotational direction of the arrow B against the ratchet teeth 27. When the normal actuating position of the release fork 23 changes due to increasing wear, then the pawl 35 will approach the edge 57 of the opening 47 in the stationary control sleeve 45, which edge 57 is located opposite the rotational direction of the arrow B. When the boundary position of wear 25 is reached, then the edge 57 will lift the pawl out of the ratchet teeth 27. The spring 55 may now rotate the sleeve 31 and consequently the pawl 35 by one tooth space of the ratchet teeth 27 and thereby readjust the normal actuating position of the clutch pedal 17.

The force of the spring 55 is small compared to the resistance which the ratchet mechanism 21 opposes to a rotation of the sleeve 31 relative to the shaft 29. The spring 55 may be omitted if necessary, because readjustment of the ratchet mechanism may also occur during the next actuation of the clutch pedal 17.

The clutch mechanism described above may also be used without modification in connection with a conventional friction clutch 61, shown schematically in FIG. 2, which is actuated by a pulling action. Such a clutch differs from the depressed clutch 1 of FIG. 1 merely in that its release element 63 acts in a pulling manner on the inner rim of a diaphragm spring 65 during release. The diaphragm spring 65 is supported at its outer rim at a flange 67 of a flywheel 69. The diaphragm spring 65 clamps a clutch disc 71 provided with friction linings between the flywheel 69 and a pressure plate 73. The pressure plate 73 is supported at a central range of the diaphragm spring 65. In both embodiments of the clutches, the elastic forces of the diaphragm spring effect the restoring forces which return the actuating mechanism to the normal actuating position.

In FIG. 3, another embodiment of an actuating mechanism for a motor vehicle friction clutch is shown. This embodiment again comprises a ratchet mechanism blocking in the disengaging direction having a pawl which is continuously elastically in engagement with a corresponding ratchet wheel. In a boundary position of wear, a control element disconnects the driving connection of the ratchet mechanism so that the normal actuating position of the actuating mechanism may automatically be readjusted. It is also important in this embodiment that the ratchet mechanism remain closed during a plurality of succeeding actuating cycles and is only automatically readjusted after a tolerance limit of wear has been reached.

FIG. 3 shows in detail an actuating mechanism 81 for a motor vehicle friction clutch which differs from the actuating mechanism 15 of FIG. 1 essentially in that a pawl 83 corresponding to the pawl 35 is pivotally supported at a shaft 87 connected with a clutch pedal 85 while a sleeve 91, corresponding to the sleeve 31 of FIG. 1, is connected with a release fork 89 which carries ratchet teeth 93. The pawl 83 and the ratchet teeth 93 together form a ratchet mechanism and for description thereof, reference is made to the description of FIG. 1. A control sleeve 95 corresponding to the control sleeve 45 lifts the pawl 83, which is continuously engaged with the ratchet teeth 93, out of the ratchet teeth 93 when the tolerance limit of wear has been reached so that the normal actuating position of the clutch pedal 85 can be readjusted. Also, in the embodiment according to FIG. 3, the control sleeve 95 releases the pawl 83 immediately after the readjusting process has commenced so that the pawl can engage into the next tooth of the ratchet teeth 93.

While specific embodiments of the invention have been shown and described in detail to illustrate the application of the inventive principles, it will be understood that the invention may be embodied otherwise without departing from such principles.

What is claimed is:

1. An operating mechanism for a device, particularly a clutch of a motor vehicle, adapted to automatically change its normal actuating position conditional upon wear comprising: first lever means supported for rotation about a first axis operable to effect actuation of said operating mechanism upon rotation thereof in a first rotational directon; second lever means supported for rotation about said first axis and arranged in operative connection with said device; and ratchet means for effecting rotational actuation of said second lever means upon rotational actuation of said first lever means, said ratchet means comprising ratchet wheel means arranged concentrically with said first axis on said second lever means, pawl means provided on said first lever means pivotally supported relative thereto arranged in operative relationship with said ratchet wheel means, means biasing said pawl means into driving engagement with said ratchet wheel means, and control means located in a path of movement of said pawl means to swivel said pawl means out of engagement with said ratchet wheel means when a boundary position of wear is reached; said pawl means being arranged for pivotal motion about a pawl pivot axis and said control means being structured as a cylindrical sleeve provided with an opening therethrough for passage of said pawl means and arranged between said pawl pivot axis and said ratchet wheel means coaxially relative to said first axis in such a manner that a rim of said opening directed in said first rotational direction presses said pawl means out of engagement with said ratchet wheel means.

2. A mechanism according to claim 1 wherein said control means is located on a side of said pawl means facing away from said first rotational direction.

3. A mechanism according to claim 1 wherein said first lever means is prestressed by means of a prestressing spring in said first rotational direction against said second lever means.

4. A mechanism according to claim 3 connected as the operating mechanism of a motor vehicle friction clutch wherein said first lever means comprises a clutch pedal of said vehicle and wherein said prestressing spring is clamped between said clutch pedal and a support attached to said vehicle.

5. A mechanism according to claim 1 wherein said first lever means is constructed as the clutch pedal of a motor vehicle.

6. A mechanism according to claim 1 wherein said second lever means is constructed as a release fork for a friction clutch of a motor vehicle.

7. An operating mechanism for a device, particularly a clutch of a motor vehicle, adapted to automatically change its normal actuating position conditional upon wear comprising: first lever means supported for rotation about an axis operable to effect actuation of said operating mechanism upon rotation thereof in a first rotational direction; second lever means supported for rotation about said axis and arranged in operative connection with said device; and ratchet means for effecting rotational actuation of said second lever means upon rotational actuation of said first lever means, said ratchet means comprising ratchet wheel means arranged concentrically with said axis on one of said first and said second lever means, pawl means pivotally supported relative to the other of said first and said second lever means arranged in operative relationship with said ratchet wheel means, means biasing said pawl means into driving engagement with said ratchet wheel means, and control means located in a path of movement of said pawl means to swivel said pawl means out of engagement with said ratchet wheel means when a boundary position of wear is reached; said first lever means comprising a cylindrical wall having a recess and said pawl means being supported in said recess of said cylindrical wall coaxially with said axis with part of said pawl means projecting beyond said recess and being provided with a slot extending perpendicularly to said axis, the bottom of said slot extending in the circumferential direction of said cylindrical wall when said pawl means is engaged with said ratchet wheel means, said mechanism further comprising a spring ring resting elastically at said cylindrical wall extending through said slot.

8. A mechanism according to claim 7 wherein said pawl means is supported at said cylindrical wall of said first lever means, said cylindrical wall enclosing said ratchet wheel means from radially outwardly thereof.

* * * * *